United States Patent [19]
Wright et al.

[11] 3,763,701
[45] Oct. 9, 1973

[54] WEB TENSION DEVICES

[76] Inventors: Graham Lennox Wright, 59 Hillfield Drive, Heswall; George Richard Ward, Warren Point, Warren Drive, Wallasey, both of England

[22] Filed: July 5, 1972

[21] Appl. No.: 269,182

[30] Foreign Application Priority Data
July 5, 1971 Great Britain.................. 31,393/71

[52] U.S. Cl. ................................................ 73/144
[51] Int. Cl. ............................................. G01l 5/04
[58] Field of Search...................... 73/144, 95.5, 159

[56] References Cited
UNITED STATES PATENTS

| | | | |
|---|---|---|---|
| 3,260,106 | 7/1966 | Hall et al. .............................. | 73/144 |
| 3,272,003 | 9/1966 | Harting ........................ | 73/88.5 R X |
| 3,589,181 | 6/1971 | Palmatier............................ | 73/144 |
| 3,554,025 | 1/1971 | Andersson et al. ................ | 73/144 X |

Primary Examiner—Jerry W. Myracle
Attorney—Watson, Cole, Grindle & Watson

[57] ABSTRACT

A web or filament tension measuring device including a shaft over which the web or filament is passed with the end of the shaft being connected by a coupling member to a frame member, the shaft or coupling member having a stress zone. The web or filament is held in such a manner as to produce a web or filament tension load component on the shaft which acts on the stress zone, which component is passed to stress sensing transducing means responsive to stresses and therefore representative of the tension in the web or filament. The stress sensing transducing means comprises a cylindrical carrier with stress responsive elements constructed on opposite sides of the cylindrical carrier.

3 Claims, 4 Drawing Figures

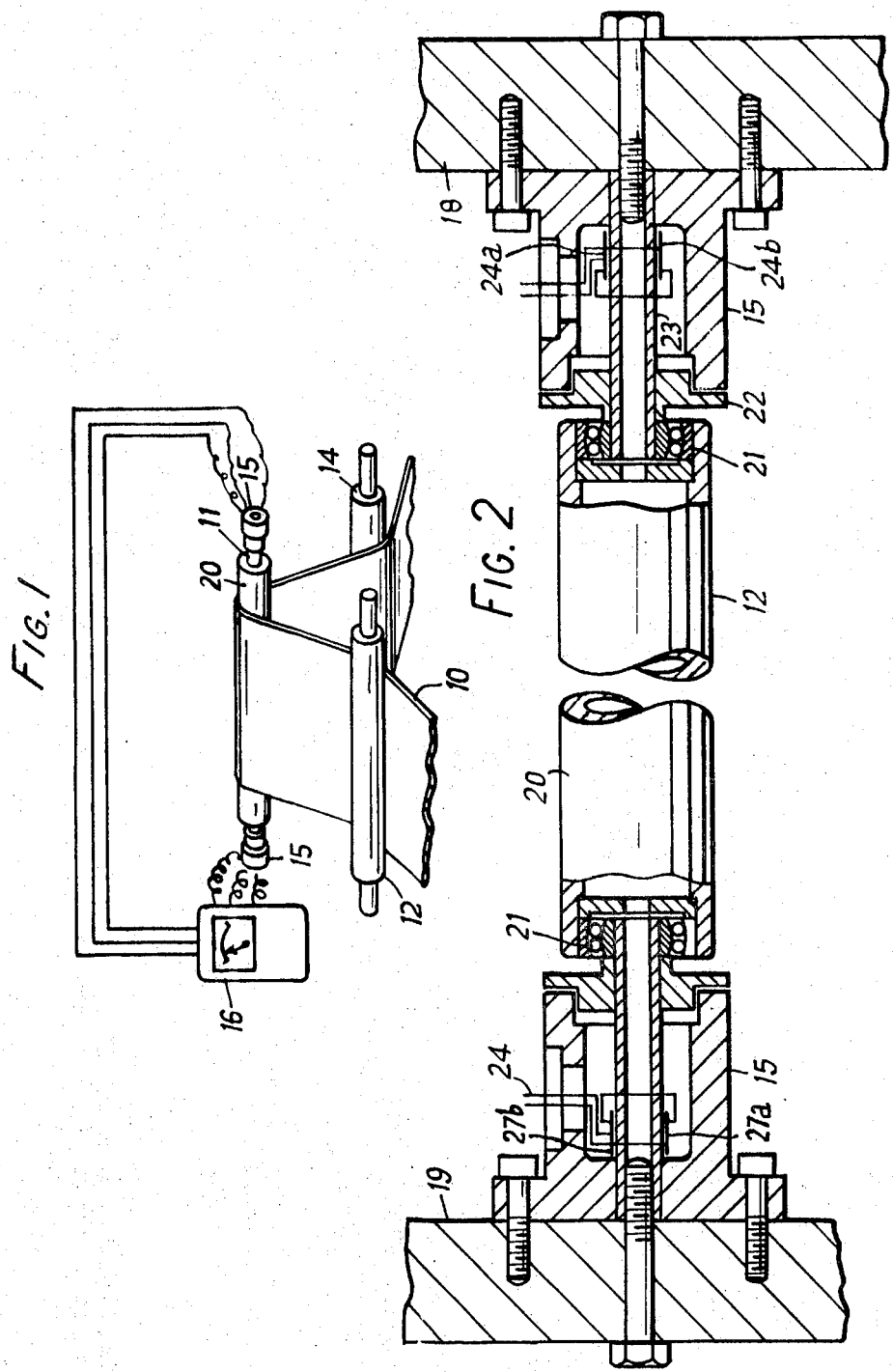

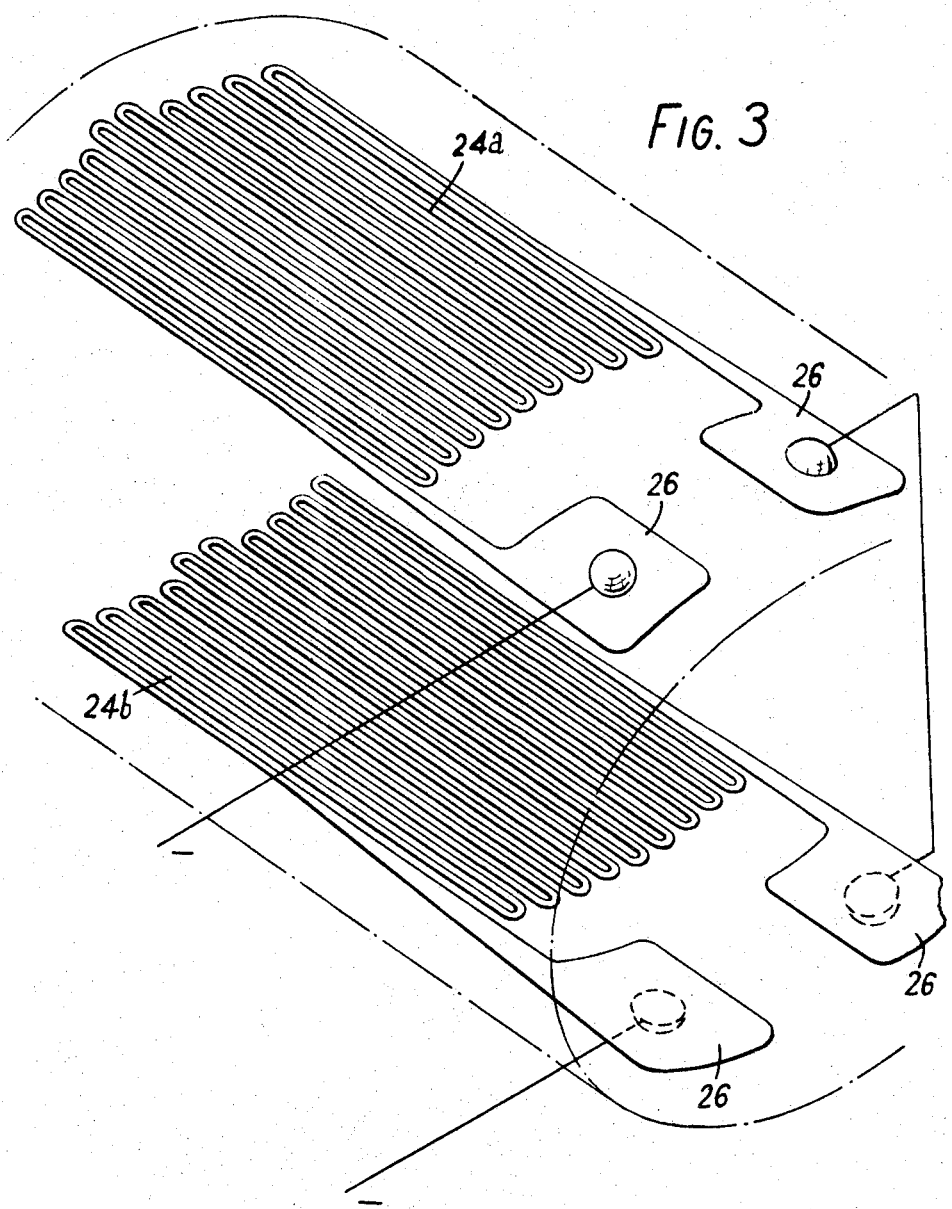

WEB TENSION DEVICES

This invention has reference to means for measuring and indicating the tension of a continuously movable web or a wire, rope yarn filament or the like, hereinafter referred to as a movable filament.

In industrial processing equipment, it is often necessary to measure and control the tension in a web. For example, in printing presses the ability to recognise the current tension in the continuously moving paper web permits optimisation of press efficiency. Equipment for measuring tension in movable webs is known and it is also known to provide a corresponding output for automatic control equipment which may be operated in a manner responsive to web tension measurement where desirable. Alternatively, a visual indicator in many applications is sufficient to permit manual intervention and control of the web tension.

Accurate measurement of web tension has been difficult in the known devices because undesirable variable input components are sensed such as friction, torque, temperature responsive, wear and hysteresis properties, which prevent accurate measurements even if equipment is carefully calibrated when initially installed.

Calibrations and installation techniques are, in themselves, quite complex in many instances requiring extensive engineering analysis and computations. In the specification of British Patent No. 1,096,244 there is described and claimed apparatus for measuring the tension in a continuously moving web. Such apparatus includes stress sensing transducing responsive to stresses in a stress zone caused by a load component to modify a signal and so represent the load component and thereafter of the tension in the web.

It is an object of the present invention to provide measuring equipment for indicating the tension of a moving web or filament which is suitable for measuring the tension of the web over wide differences of tension.

According to the present invention, apparatus for measuring the tension in a web or filament comprises at least one frame member, a shaft extending from the frame member and having web engaging means mounted thereon with the end of the shaft being connected by a coupling member to the frame member, said shaft or coupling member having a stress zone, means for holding the web or filament in engagement with the web or filament engaging means for producing a web or filament tension load component on the shaft which acts on the stress zone and stress sensing transducing means responsive to stresses in the said zone caused by said load component and therefore representative of the tension in the web or filament and wherein the stress sensing transducing means comprises a cylindrical carrier with stress responsive elements constructed on opposite sides of the cylindrical carrier.

Preferably, the stress responsive elements on opposite sides of the cylindrical carrier are electrically connected to electrically adjacent arms of an electrical bridge circuit, for example, a Wheatstone bridge circuit.

A web tension meter in accordance with the present invention will now be described by way of example with reference to the accompanying drawings wherein:

FIG. 1 is a perspective view of a web tension meter installation in the path of a moving web.

FIG. 2 is a plan view partially in section of a tension measuring shaft.

FIG. 3 is an enlarged view of the tension responsive device and

Figure 4:
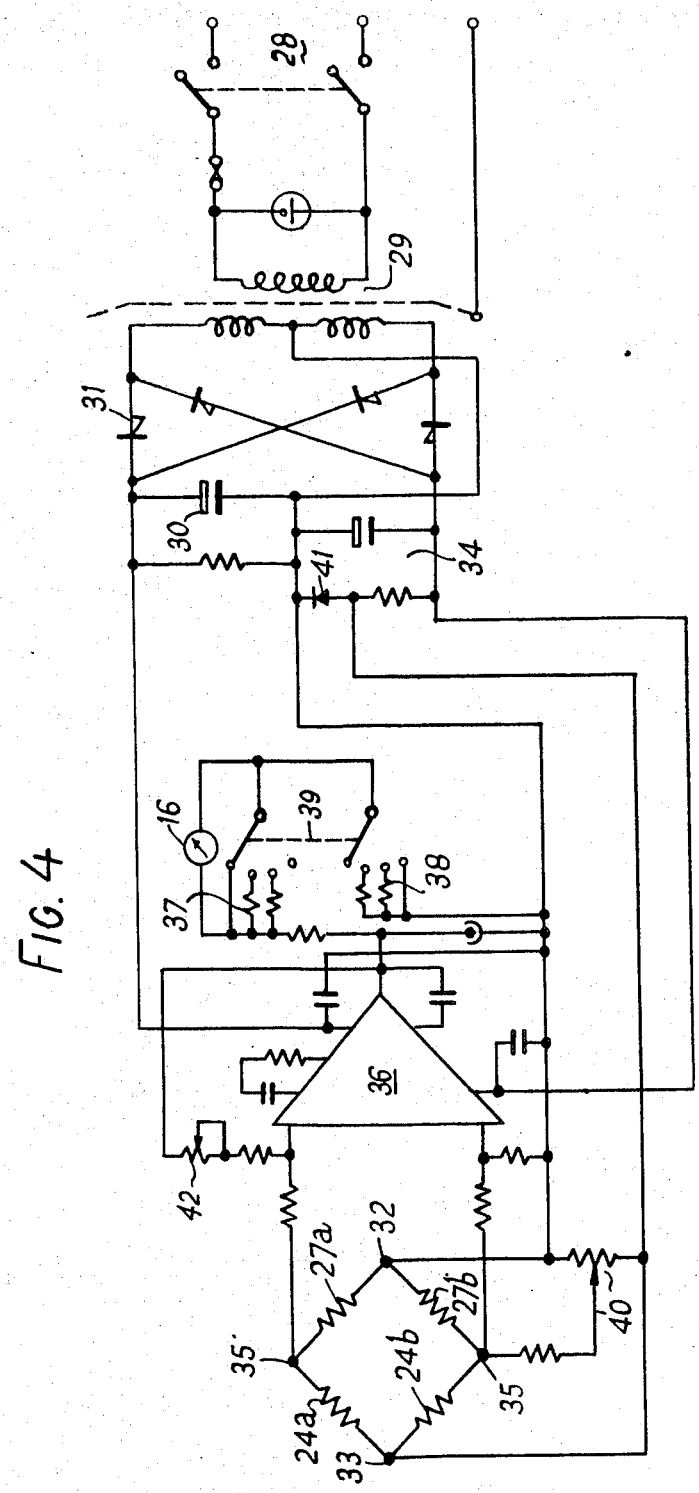
FIG. 4 is a circuit in which the stress responsive devices are connected.

A typical web tension mounting is illustrated in FIG. 1 and includes a continuously moving web 10 which is fed over a measuring shaft 11 with an associated roller 20 mounted around the shaft 11. This measuring shaft is displaced from a pair of feed or idler rollers 12 and 14 which act as guide rollers. The web is fed first around the roller 12 and then around the roller 20 and then around the roller 14 in such a way that the web tension load component tends to displace the measuring shaft 11 downwardly when tension is applied to the moving web whereby a stress is set up in a stress zone of the measuring shaft 11 as the web passes over the measuring shaft 20.

A force sensor is mounted within each of the pair of housings 15 mounted on opposite ends of the shaft 11. The force may be sensed by stress responsive elements preferably a pair of resistive strain gauges and monitored by appropriate electronic circuits to a meter shown diagrammatically at 16 and calibrated to display the force resulting from the tension within the web or filament passing over the roller 20.

As shown in FIG. 2 the roller 20 is rotatably mounted on suitable self aligning bearing 21 but the roller 20 need not rotate as the web passes over it.

The housings 15 are secured by bolts to a respective side frame member 18,19 and an end cheek 22 covers the inner end of each housing 15 but with a gap between the cheek and housing to permit deflection of the cylindrical beam to be hereinafter described. A cylindrical beam 23 of circular cross section is mounted within each housing 15 and extends inwardly within the roller 20 and within the respective bearings 21. Strain gauges 24 are secured by adhesive to opposite sides of the cylindrical beam 23 which constitutes a carrier for the strain gauges. The beam and strain gauges constitute a measuring shaft. Preferably the one strain gauge 24a is located as nearly as possible vertically above the other strain gauge 24b and each strain gauge is located as near as possible to the outer end of the cylindrical bear 23 when mounted within the web tension mechanism. Preferably the strain gauge consists of a thin film of metal which is formed by evaporation techniques on a base of eposy film. It is preferably that the material of the evaporated film has the same or compensated co-efficient of linear expansion as the material of the cylindrical beam 23 to compensate for temperature changes. For example the cylindrical beam and the strain gauge may both be of aluminium. Similarly the cylindrical beam may be of phosphor bronze and the strain gauge be of aluminium, the strain gauge being compensated to the coefficient of linear expansion of the phosphor bronze by being mounted on the epoxy film base.

Because the roller 20 is mounted between measuring shafts at opposite ends of the roller 20 any increase in tension in the web 10 will tend to urge the roller downwardly, thereby causing a downward force to be applied to the outer end of each of the shafts 11, thereby the upper side of the shaft is in tension and the lower side of the shaft is in compression. These forces tend either to expand (thereby to increase the effective electrical resistance of) the upper strain gauge and to contact (thereby to decrease the effective electrical existance of) the lower strain gauge.

As shown in FIG. 3 the strain gauges each consist of a pair of electrical connections 26 joined by a length of metallic film arranged in a non-inductive convolute path in which the arms of the convolute path do not impinge on one another. Preferably this convolute path consists of a plurality of arms each one parallel to an adjacent arm and being connected to the adjacent path at its respective ends.

Referring to FIG. 4 of the drawings the two strain gauges 24a, 24b are connected up in electrically adjacent arms of a Wheatstone bridge circuit. Thus, as shown, the strain gauges 24a, 24b are connected up in electrically adjacent arms of this circuit. The other two arms 27a, 27b of the Wheatstone bridge comprise resistances of comparable resistance value to the resistance value of the strain gauges 24a, 24b. These two other arms 27a, 27b may comprise strain gauges formed on the cylindrical beam 23 spaced around the periphery of the beam between the strain gauges 24a, 24b. Referring again to FIG.4 the Wheatstone bridge circuit is supplied with electric potential from an alternating current supply 28 through a transformer 29 and a bridge rectifier circuit 31.

The circuit includes smoothing condensers 30. The output from the power supply consists of a voltage regulation diode 41 and resistances in series and there is a connection from across the voltage regulation diode 41 to the points 32, 33 of the Wheatstone bridge circuit. The other two opposite points 35 of the Wheatstone bridge are respectively connected to a high gain amplifier 36 whose output is connected to a meter 16. Two sets of non inductively wound resistances 37, 38 and a ganged switch 39 are connected in the circuit to the meter 16 to enable the meter to be used for different ranges. Further, a potentiometer 42 is included to compensate for different angles of wrap of the web around the roller 20 and potential divider circuit 40 is included for meter zeroizing purposes.

Although the tension meter described is particularly useful in connection with the measurement of the tension of a paper web passing around a cylinder of a printing press, it may have other applications. For example, it may be useful in measuring the tension in a length of elongated wire being fed through a wire drawing machine or it may be used for measuring warp tension in textile machinery, or yarn tension in spinning and carding. In these cases the wire or yarn or the like is fed around a roller a pulley or drum mounted on a shaft whose ends are supported on a carrier bearing stress responsive elements preferably similar to those shown in FIG.3 and connected in a circuit as shown in FIG.4.

If desired, two other strain gauges may be used for an application when, for example only one transducer is to be employed.

What we claim is:

1. Apparatus for measuring the tension in a moving web, comprising:
    spaced frame members;
    a shaft extending between said frame members for tensioning said web;
    means for coupling respective ends of said shaft to the respective frame members, said means for coupling each including deflection members comprising a hollow shaft and extending from a respective side frame to a respective end of said shaft, and a bearing for mounting the end of said shaft to said hollow shaft; and
    strain sensing transducing means mounted on each of said deflection members for generating a signal representing the tension of said moving web.

2. Apparatus for measuring tension according to claim 1 wherein each strain sensing transducing means comprises a length of thin metallic film arranged in a non-inductive convolute path and formed by evaporation techniques on a base.

3. Apparatus for measuring tension according to claim 2, wherein the thin metallic film is of aluminium which is formed on a base of epoxy film.

* * * * *